(No Model.)
H. R. BUTTERFIELD.
ELECTRIC HEATING AND COOKING DEVICE.
No. 424,403. Patented Mar. 25, 1890.
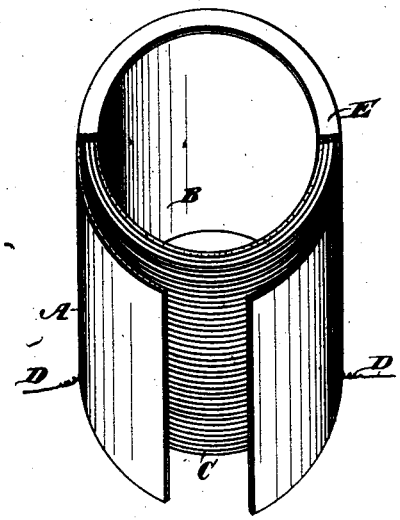
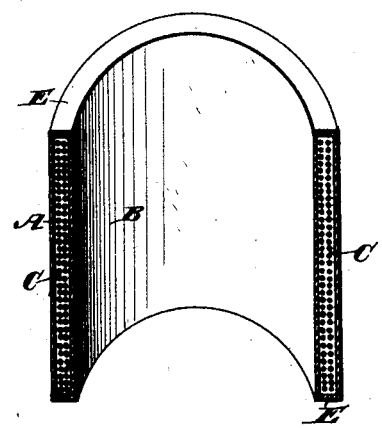
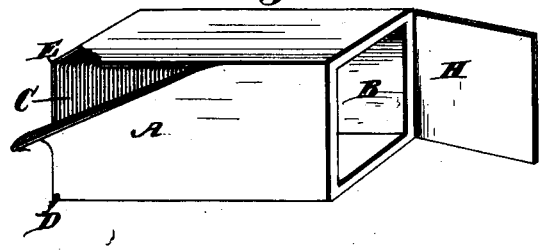
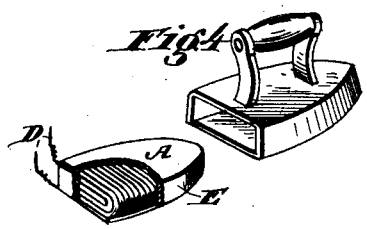
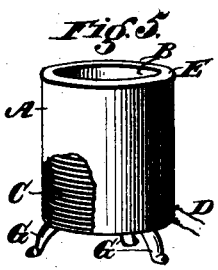
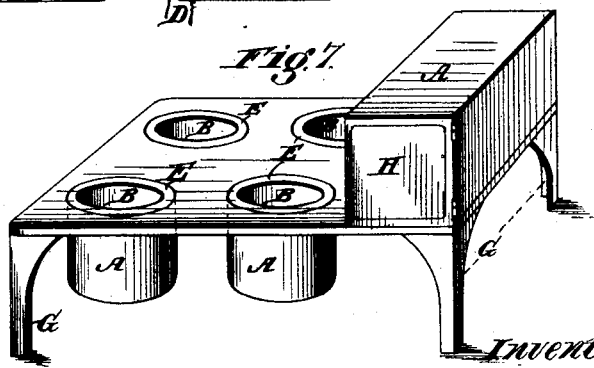
Witnesses
Inventor
Henry R. Butterfield
by W. H. Babcock
Attorney

UNITED STATES PATENT OFFICE.

HENRY R. BUTTERFIELD, OF WATERVILLE, MAINE, ASSIGNOR TO THE BUTTERFIELD & MITCHELL ELECTRIC COOKING AND HEATING COMPANY, OF SAME PLACE.

ELECTRIC HEATING AND COOKING DEVICE.

SPECIFICATION forming part of Letters Patent No. 424,403, dated March 25, 1890.

Application filed July 27, 1889. Serial No. 318,915. (No model.)

*To all whom it may concern:*

Be it known that I, HENRY R. BUTTERFIELD, a citizen of the United States, residing at Waterville, in the county of Kennebec and State of Maine, have invented certain new and useful Improvements in Electric Heating and Cooking Devices; and I do hereby declare the following to be a full, clear, and exact description of the invention, such as will enable others skilled in the art to which it appertains to make and use the same.

This invention relates to devices for cooking and heating by means of electricity; and its object is to simplify and cheapen such devices and render them more effective. To this end I inclose a layer of continuous wire arranged in coils, preferably not insulated one from another, between two layers of asbestus and give to the material thus produced the shape of an oven, a boiler, or other cooking utensil, article, or structure, the ends of the coil being also protected by asbestus and the wire connecting terminally with circuit-wires, so that a current of electricity will pass through it.

In the accompanying drawings, Figure 1 represents a cylindrical cooking device embodying my invention, the outer layer of asbestus being partly opened and turned away to show the wire. Fig. 2 represents a longitudinal section through the same. Fig. 3 represents in perspective a rectangular oven constructed according to my invention, the outer layer of asbestus being partly opened, as in Fig. 1. Figs. 4, 5, and 6 represent, respectively, detail perspective views of flat-irons, of an upright cylindrical heater, and of a boiler, each having the outer layer removed in part to show the wire and each constructed according to my invention. Fig. 7 represents in perspective a stove having an oven and cylindrical heaters for pot-holes according to my invention.

A designates the exterior layer of asbestus; B, the internal layer; C, the coiled wire between them, from which I get the best results when left quite naked; D, the ends of said wire connecting with the wire of the electric circuit, and E the strips connecting the ends of the asbestus layers in order that the coil of wire as a whole may be completely inclosed. For most purposes I prefer a cylindrical device like that shown in Figs. 1, 2, and 5. When used as an oven, it is arranged horizontally, and the ends may be closed in any convenient way, or left open, as shown. The outer and inner layers are of course cylindrical and the end strips E are flat rings. The coil of wire as a whole has a cylindrical form. When used for heating, the cylinder is set upright, as in Fig. 5, and supported by short legs G.

The rectangular oven shown in Fig. 3 differs mainly in shape from that above described, the principle being the same. It is provided with an oven-door H, open in said figure.

In winding a naked wire on the inner layer B of insulating material care must be taken to keep the coils from touching to prevent short-circuiting. The wire may be covered with insulating material also, if desired; or when two layers of naked wire are used it will be found convenient to separate the coils of the outer layer by small pieces of insulating material and to insert the same between the outer and the inner layer of wire, or to wind one thickness of the inner wall of insulating material between the layers of wire.

As shown in Fig. 4, the lower part of a flat-iron may contain a casing consisting of two flat layers of asbestus with the coil between them and connected at the edges by strips. As shown in Fig. 6, two flat plates or layers of asbestus may have the wire between them and be connected by strips of asbestus, as above, at the edges, the whole constituting a composite heating and cooking plate adapted to receive a frying-pan, a gridiron, or other utensil of similar use. These figures will suffice to illustrate the varied applicability of my invention; but many different articles used in cooking or for similar purposes may be constructed in this way. The heat is generated by the resistance to the passage of the electric current, and the asbestus protects the wire from contact with any external body and insulates it as a whole electrically, although the wire is not covered throughout its length, and although sufficient heat is allowed to escape through the asbestos for heating and cooking.

This electric cooking device is very durable, since the wire of course cannot burn the asbestos, and the asbestos preserves the wire from rusting and from injury.

My electric heating device may be used for heating buildings and for all analogous purposes.

Having thus described my invention, what I claim as new, and desire to secure by Letters Patent, is—

1. In an electric cooking or heating device, an interior layer of insulating material, wire wound thereon, and an exterior layer of insulating material inclosing all the metal parts of the device, substantially as set forth.

2. In an electric heater, an exterior layer of insulating material, an interior layer of insulating material concentric therewith, and an interposed coil of wire, the ends of said insulating-material layers being connected by strips or rings and the wire forming part of an electric circuit, substantially as set forth.

3. In an electric heater, a wire forming part of an electric circuit and wound in layers properly separated from each other to prevent short-circuiting, in combination with two concentric walls or layers of insulating material, one of the latter being within these layers of wire and the other being outside of them, and all the metal parts of the device being inclosed within said exterior layer, substantially as set forth.

4. A cylindrical heating device consisting of coils of wire C, arranged in layers which are separated to prevent short-circuiting, in combination with a cylindrical layer B of insulating material, about which said coils are wound, and a cylindrical exterior layer A of insulating material inclosing all the metal parts of the device, the said wires being in an electric circuit, and the whole constituting an electric heating-cylinder, substantially as set forth.

In testimony whereof I affix my signature in presence of two witnesses.

HENRY R. BUTTERFIELD.

Witnesses:
  SAM A. MITCHELL,
  WILLIS MITCHELL.